(12) United States Patent
Wipf et al.

(10) Patent No.: US 6,474,462 B2
(45) Date of Patent: *Nov. 5, 2002

(54) APPARATUS FOR CONVEYING AND TEMPORARILY STORING PRODUCTS

(75) Inventors: Alfred Wipf, Jestetten (DE); Harald Lenherr, Beringen (CH); Ralf Frulio, Jestetten (DE)

(73) Assignee: SIG Pack Systems AG (CH)

( * ) Notice: Subject to any disclaimer, the term of this patent is extended or adjusted under 35 U.S.C. 154(b) by 10 days.

This patent is subject to a terminal disclaimer.

(21) Appl. No.: 10/028,128

(22) Filed: Dec. 20, 2001

(65) Prior Publication Data

US 2002/0079199 A1 Jun. 27, 2002

(30) Foreign Application Priority Data

Dec. 22, 2000 (CH) .............................................. 2503/00

(51) Int. Cl.⁷ .............................................. B65G 37/00
(52) U.S. Cl. .................................................. 198/347.1
(58) Field of Search ........................ 198/347.1, 471.1, 198/460.1, 461.1

(56) References Cited

U.S. PATENT DOCUMENTS 3,124,065 A * 3/1964 Bozek et al. ............ 198/471.1
5,291,985 A * 3/1994 Spatafora et al. ........ 198/471.1

FOREIGN PATENT DOCUMENTS

DE 42 09 774 A1 12/1992

\* cited by examiner

Primary Examiner—James R. Bidwell
(74) Attorney, Agent, or Firm—Harness, Dickey & Pierce, P.L.C.

(57) ABSTRACT

The apparatus comprises an incoming conveyor and a revolving device, in which grippers (9) circulate at a regular first spacing ($T_1$) over a closed circulating path (10). The grippers (9) can be individually switched between a first state, in which they take hold of the products (2) and carry them along, into a second state, in which they release the products from the grippers. At a transfer point (11) the grippers (9) pass above the incoming conveyor (1). They are switched at the transfer point (11) into the first state, in which they each take hold of a product and carry it along. A store (16) has carriers (19) which circulate at a regular second spacing ($T_2$) in a closed, second circulating path (15). The second circulating path (15) runs over a buffer region (20) parallel to the first circulating path (11). Within the buffer region (20) the grippers (9) can be switched into their second state. The circulating speed of the grippers (9) is greater than the circulating speed of the carriers (9). A control device (29) controls the switching of the grippers (9) into the second state in such a manner that each storage compartment (28) between adjacent carriers (19) downstream of the buffer region (20) contains a product (2).

10 Claims, 4 Drawing Sheets

APPARATUS FOR CONVEYING AND TEMPORARILY STORING PRODUCTS

FIELD OF THE INVENTION

The invention concerns an apparatus for conveying and temporarily storing products.

BACKGROUND OF THE INVENTION

A transporting apparatus having a revolving means is disclosed in DE-A 42 09 774. The revolving arrangement removes individual items from an incoming conveyor and conveys them along an essentially curved route to an outgoing conveyor. The outgoing conveyor is designed in such a manner that it conveys the items in groups which each contain a fixed number of items. The carriers of the revolving arrangement preferably release the items before they reach the outgoing conveyor, so that the items are put into groups directly upstream of the outgoing conveyor.

SUMMARY OF THE INVENTION

It is an object of the present invention to provide a transporting apparatus which combines an efficient storage function when a following machine, for example a supplementary packaging machine, is started up, with plugging of any gaps in the supplied products. This object is achieved by the features of claim 1.

BRIEF DESCRIPTION OF THE DRAWING

Exemplary embodiments of the invention will be explained below with reference to the drawing, in which.

DESCRIPTION OF THE PREFERRED EMBODIMENT

Figure 1:
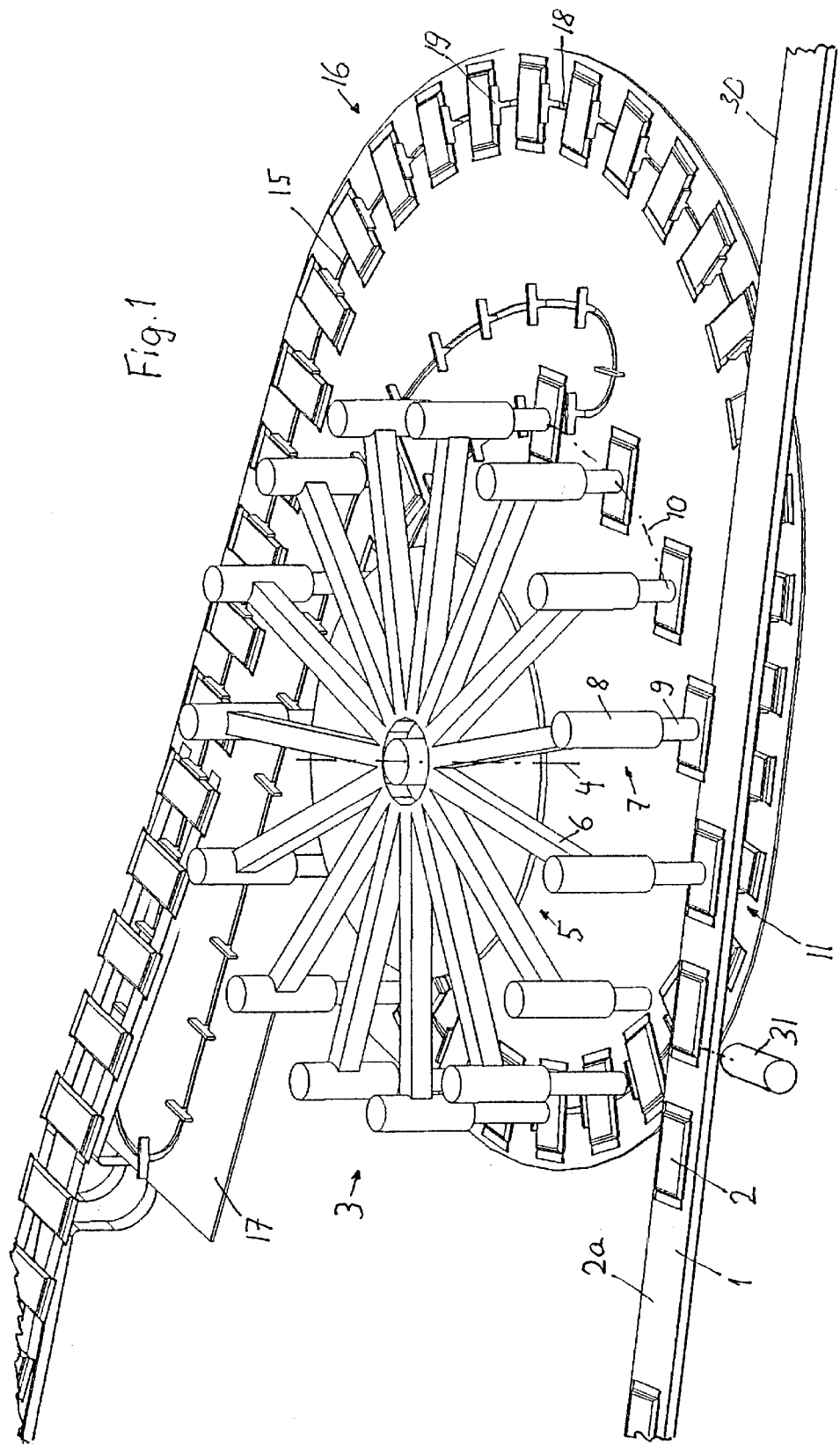
FIGS. 1 and 2 show perspective, schematic views of a first embodiment.

Elongated products 2, for example packaged chocolate bars, are delivered on a horizontal incoming conveyor belt 1 at regular intervals with their longitudinal extent in the transporting direction. A frequent occurrence is that one product 2 from the column is missing, which is indicated at the point 2a, for example because it has been removed at a testing station.

A revolving device 3 has a rotor 5 which can rotate about a vertical axis 4 and has a multiplicity of arms 6 projecting radially at a regular angular spacing. A gripping device 7 is fitted to the free end of each arm 6. The gripping device 7 comprises an actuator 8 which actuates a gripper 9, which is designed as a suction tube. The gripper 9 can be moved axially by the actuator 8 from a raised position via an intermediate position into a lowered position and can be pivoted through 90° about its axis. Each vacuum valve for the grippers 9 can be operated individually. When the vacuum valve is switched on, the gripper 9 is activated and grasps and holds a product 2 until it is deactivated by the valve being switched off. The circular circulating path 10 of the grippers 9 is tangent to the longitudinal central line of the belt 1 at a first transfer point 11. The spacing $T_1$ between the grippers 9 is identical to the spacing T between the products 2 on the belt 1. The circulating speeds of the belt 1 and of the grippers 9 are identical.

Below the grippers 9, the horizontal plane of the circulating path 15 of a store 16 is indicated. The store 16 comprises a sliding plate 17 having a slot 18 forming the circulating path 15. A chain (not illustrated) or a toothed belt revolves below the slot 18. Carriers 19 are fastened to the chain at a regular, second spacing $T_2$. The spacing $T_2$ is smaller than the spacing $T_1$. Via a buffer region 20, the path 15 runs vertically below the path 10, i.e. likewise in an arc of a circle.

At a second transfer point 25, two parallel conveyor belts 26 of an outgoing conveyor 27 on both sides of the slot 18 run inclined obliquely upward from a deflection roller below the sliding plate 17. At the transfer point 25, said conveyor belts lift up the products 2 from the sliding plate 17 until they are above the upper edge of the carriers 19, so that said carriers are guided back along the path 15 to the upstream end of the region 20.

In normal operation, the apparatus operates as follows: A respective gripper 9 and a product 2 arrive at the transfer point 11 at the same time. The gripper 9 is lowered and the vacuum switched on, with the result that the product 2 is grasped and raised into the upper position of the gripper 9. Further rotation of the rotor 5 causes the gripper 9 to be rotated through 90°. In the region 20, the gripper, when it reaches the furthest downstream compartment 28 which is still empty, is lowered between two carriers 19 and the vacuum is switched off, so that the product 2 falls onto the plate 17 and is carried along by the next carrier 19. The circulating speed of the carriers 19 is synchronized with that of the grippers 9 in such a manner that this takes place in, for example, the last third of the region 20. The lowering movement can be controlled by the control device 29, for example by a vacuum switch, it being recognized, for example by a sensor, whether or not a gripper 9 is being loaded in the region between the station 11 and the upstream end of the buffer region 20, and with this signal the lowering of the following gripper 9 is appropriately retarded. However, a sensor for recognizing the rearmost, filled compartment 28 may also be fitted to each gripper 9. The spatial position of the lowering movement, i.e. the angle of rotation of the rotor 5 between the passage of a gripper 9 through the station 11 and its lowering movement, can be used for synchronizing the belt 1 and the grippers 9 with the circulating speed of the carriers 19 or vice versa.

If more products are suddenly supplied on the belt 1, the buffer region of the store 16 is filled. As a result, the transfer point from the revolving device 3 to the store 16 is displaced upward in the buffer region 20. The store 16 is therefore filled in this phase. If fewer products 2 are suddenly supplied on the belt 2, the transfer point is displaced downstream again. In normal operation, the transfer point remains fixed.

As a rule, a plurality of the described apparatuses are operated in parallel next to one another. If one of the machines supplied therewith has a failure, the associated store 16 is shut off. The revolving device 3 can continue to rotate, but the grippers 9 are not lowered at the transfer point 11. The products 2 continue along the belt 1 to a reserve apparatus which is connected downstream and supplies a reserve machine. A plurality of apparatuses operating in parallel supplies the same reserve apparatus. The branch 30 of the conveyor belt 1 downstream of the transfer point 11 thus forms a second outgoing conveyor.

As an alternative to this, a second outgoing conveyor 27 may also be arranged upstream of the illustrated conveyor 27, for the purpose of feeding the reserve machine. In this second outgoing conveyor, the conveyor belts 26 can be pivoted about the axis of their downstream deflection rollers from a raised normal position, in which the outgoing conveyor 27 is supplied, into a downwardly inclined position, in which the reserve machine is supplied in turn by interconnection of a collecting conveyor for a plurality of apparatuses operated in parallel.

The apparatus described has an efficient storage function both for compensating for missing products 2 on the incoming conveyor 1 and for fluctuations in the speed of the outgoing conveyor 27, for example during the starting-up procedure of the machine supplied by it. Said apparatus enables a reserve machine to be connected in series to one of a number of supplementary packaging machines which has an interruption. It therefore combines a plurality of functions in a very narrow space and is cost-effective to operate as a result.

If, on the supply conveyor belt 1, the spacing T fluctuates about an average value, it is expedient to design the drive of the rotor 5 as a servo motor and, upstream of the transfer point 11, to arrange a product sensor 31 for detecting the position of the products 2 on the belt 1. If a product is proceeding ahead of the average spacing, the rotor 5 is correspondingly accelerated before the gripper 9 concerned arrives at the transfer point 11, so that said gripper 9 takes hold of the product 2 approximately centrally. After the product 2 has been lifted up, the rotor 5 is returned back to its synchronous angle of rotation.

As an alternative to this, the arms 6 or an outer part thereof may also be fastened to the rotor 5 in a manner such that they can pivot about vertical axes. The pivoting angle is controlled by a separate actuator in each case, which enables the same effect to be obtained.

Figure 3:
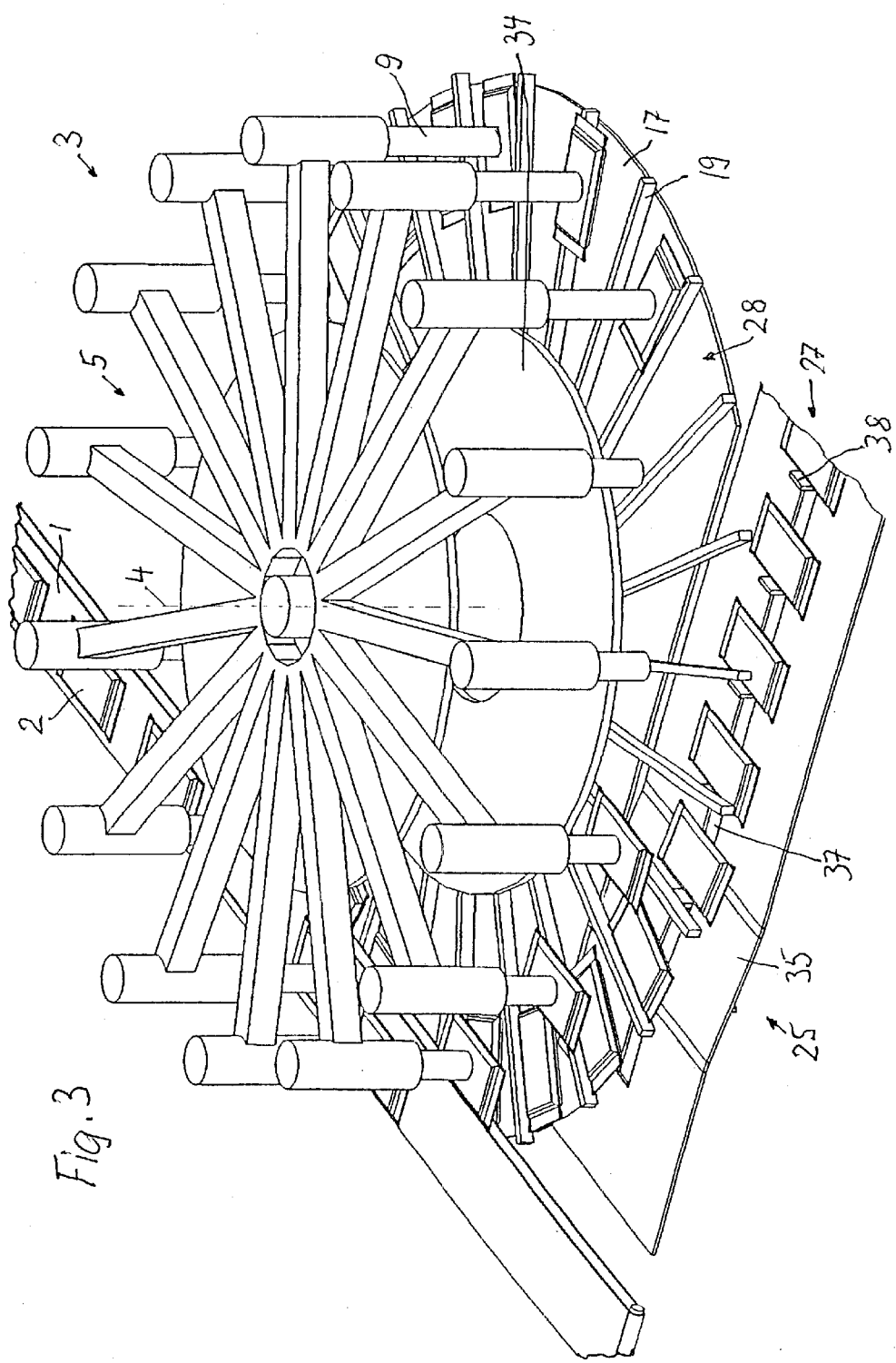
FIG. 3 shows a perspective view of a second embodiment.

In the embodiment according to FIG. 3, parts which are identical are provided with the same reference numbers, thereby rendering a detailed description of these parts superfluous. In this embodiment, the carriers 19 are designed as spokes of a second rotor 34, said spokes circulating above the sliding plate 17 and coaxially with respect to the axis 3 and below the conveyor belt 1. At the transfer point 25, the sliding plate 17 merges into a downwardly inclined ramp 35. Running in this ramp and the adjoining, horizontal sliding plate 36 is a longitudinal slot 37 through which circulating carriers 38 of the outgoing conveyor 27 protrude.

Figure 4:
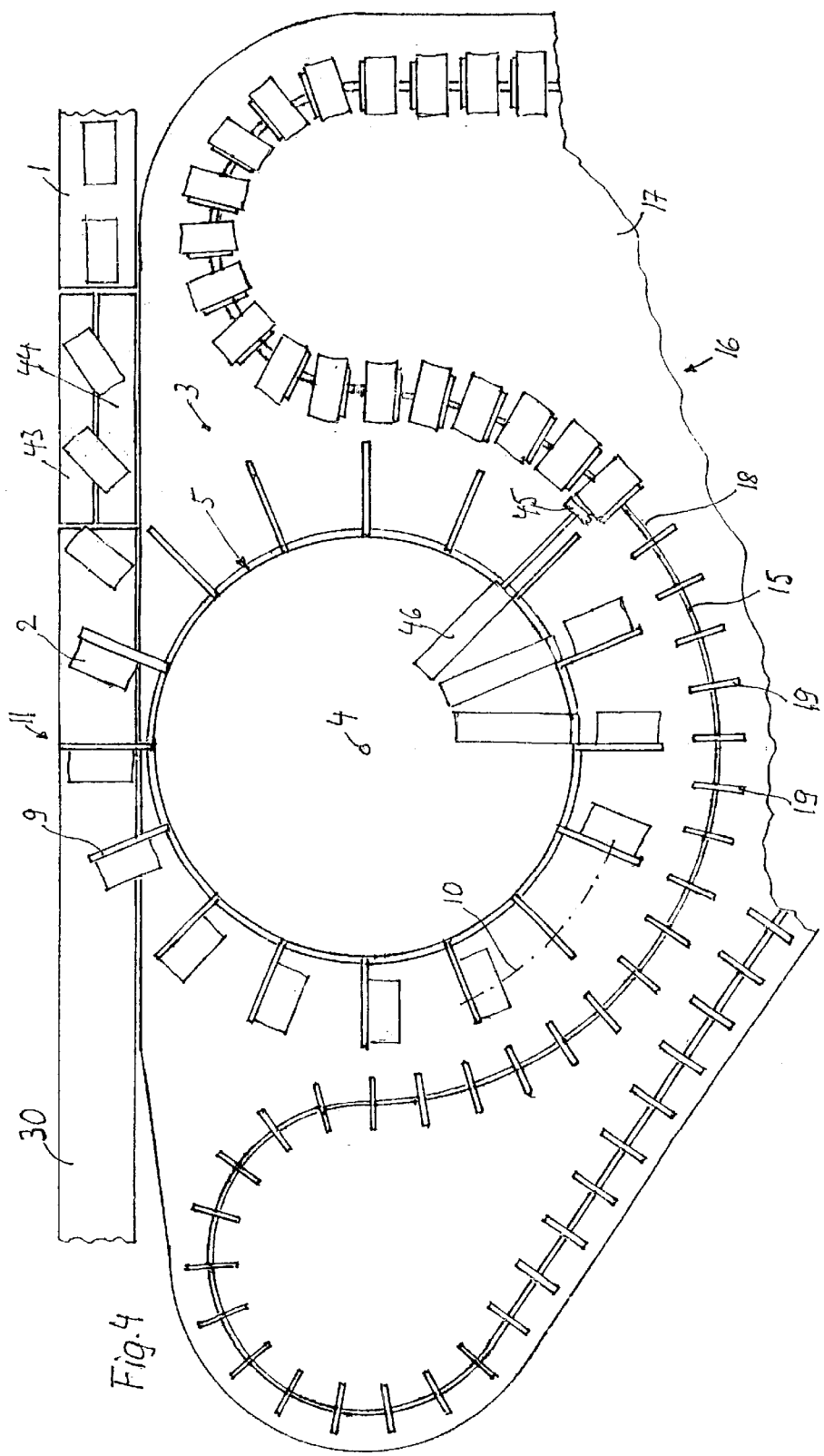
FIG. 4 shows a plan view of a third embodiment.

In the embodiment according to FIG. 4, the surface of the sliding plate 17 is just below the upper side of the conveyor belt 1. Two parallel conveyor belts 43, 44 are connected to the incoming conveyor belt 1. The outer conveyor belt 43 runs more rapidly than the incoming conveyor belt 1 and the inner conveyor belt 44 runs more slowly than the incoming conveyor belt 1. As a result, the products 2 on the conveyor belts 43, 44 are rotated counterclockwise through approximately 50°. The conveyor belt 30, which is also used as the outgoing conveyor belt, is connected to the conveyor belts 43, 44.

Figure 2:
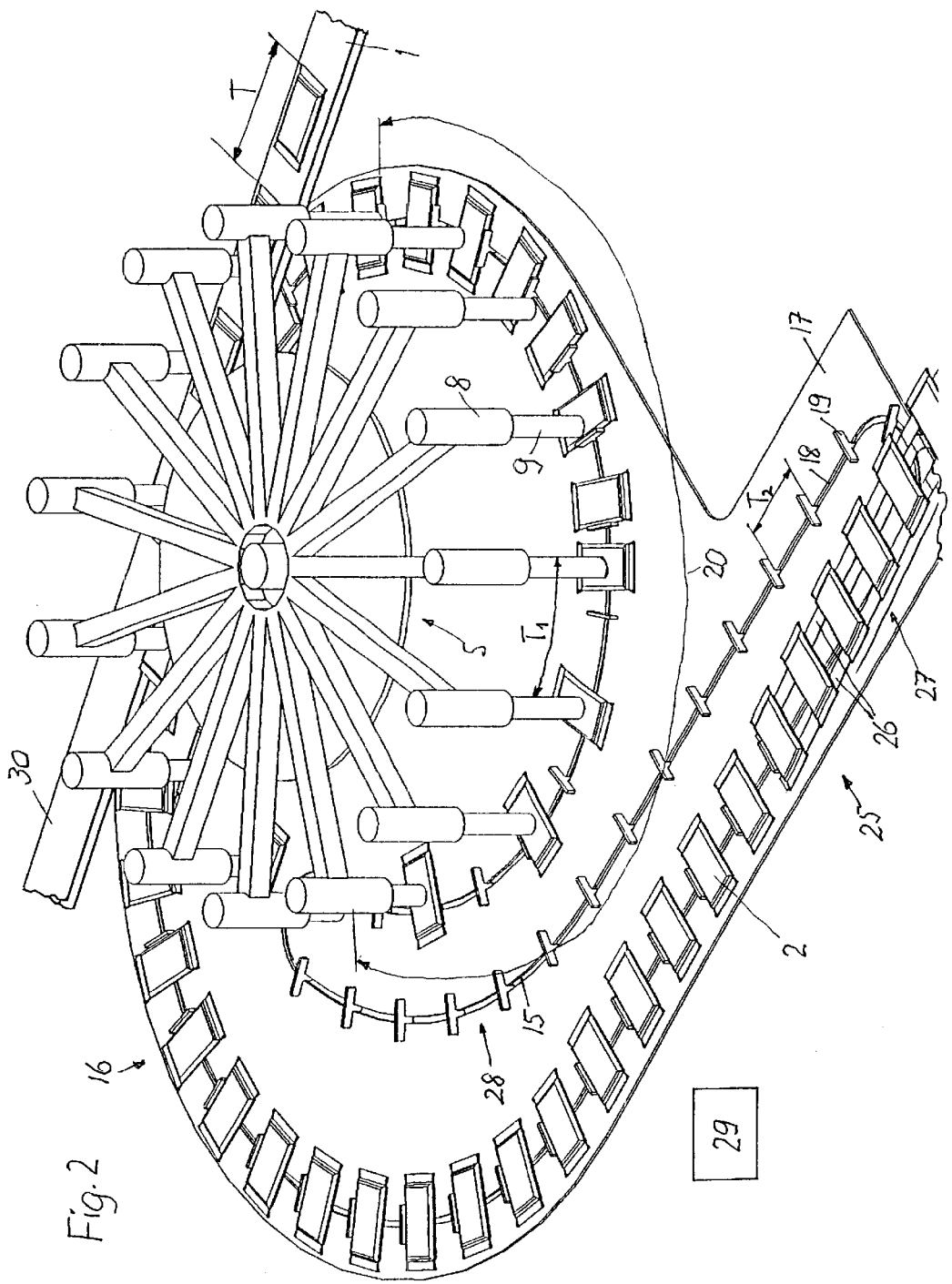

In this case, the grippers 9 are bar-shaped carriers which protrude radially from the rotor 5 and push the products 2 from the belt 30 onto the sliding plate 17. Each carrier 9 is assigned a tappet 45 which is actuated by a respective actuator 46, for example a pneumatic cylinder, for the transfer of the products 2 onto the store 16 in the same manner as described in the embodiment according to FIGS. 1 and 2.

In this case, the store 16 is at the same time the outgoing conveyor which directly supplies the attached supplementary packaging machine. The circulating path 15 of the store 16 runs over approximately 180° parallel (concentrically) to and below the circulating path 10 of the grippers 9. This variant is more tolerant to fluctuations in the spacing T of the products 2 on the belt 1 since, because the products 2 have been rotated in advance, the distances between them at the transfer point 11 are greater than in the previously described embodiment.

In the event of an interruption to the machine supplied by the store 16, the store 16 is shut down and the rotor 5 is raised by at least the height of the products 2. The products 2 are then conducted below the rotor by the conveyor belt 30 to the reserve machine. In this case, the conveyor belts 43, 44 are expediently driven at the same speed.

What is claimed is:

1. An apparatus for conveying and temporarily storing products (2), comprising:

an incoming conveyor (1), a revolving device, in which grippers (9) circulate over a closed, first circulating path (10), said grippers (9) being individually switchable between a first state, in which they take hold of said products (2) and carry them along, into a second state, in which they release said products (2) from said grippers (9), said grippers (9), in a first transfer point (11), passing above said incoming conveyor (1) and, in said first transfer point (11), being in said first state or being switched into said first state and taking hold of said products (2) delivered on the incoming conveyor (1) and carrying them along, and said grippers (9) having a regular first spacing ($T_1$), at least outside a region of the first transfer point (11), a store (16) having carriers (19) which circulate at a regular second spacing ($T_2$) in a closed, second circulating path (15), said second circulating path (15) running over a buffer region (20) parallel to said first circulating path (11) and said grippers (9) being switchable within said buffer region (20) into their second state, and said grippers (9) having a circulating speed being greater than a circulating speed of said carriers (19), and a control device (29) which controls switching of said grippers (9) into said second state in such a manner that each storage compartment (28) between adjacent carriers (19) downstream of said buffer region (20) contains a product (2).

2. The apparatus as claimed in claim 1, the second circulating path (15) being arranged along said buffer region (20) below said first circulating path (11).

3. The apparatus as claimed in claim 1, said revolving device (3) being of circular or oval design.

4. The apparatus as claimed in claim 1, said store (16) being of circular design and having a common axis of rotation (4) with said revolving device (3).

5. The apparatus as claimed in claim 1, said apparatus being connected to at least one outgoing conveyor (27, 30).

6. The apparatus as claimed in claim 1, comprising one incoming conveyor (1) and two outgoing conveyors (27, 30), and said incoming conveyor (1) being arranged in alignment with one of said outgoing conveyors (30).

7. The apparatus as claimed in claim 1, said first spacing ($T_1$) being larger than said second spacing ($T_2$).

8. The apparatus as claimed in claim 1, said grippers (9) on said revolving device (3) being designed as carriers.

9. The apparatus as claimed in claim 1, said grippers (9) being fixed in a pivotable manner on said revolving device (3).

10. The apparatus as claimed in claim 1, said products (2) being chocolate bars.

* * * * *

UNITED STATES PATENT AND TRADEMARK OFFICE
CERTIFICATE OF CORRECTION

PATENT NO. : 6,474,462 B2
DATED : November 5, 2002
INVENTOR(S) : Wipf et al.

It is certified that error appears in the above-identified patent and that said Letters Patent is hereby corrected as shown below:

<u>Title page,</u>
Item [*], Notice, delete "This patent is subject to a terminal disclaimer"

Signed and Sealed this

Thirteenth Day of May, 2003

JAMES E. ROGAN
*Director of the United States Patent and Trademark Office*